Feb. 20, 1934.　　　　F. A. KING　　　　1,947,853
MECHANICAL MOVEMENT
Filed April 5, 1932　　　3 Sheets-Sheet 1

Inventor
Frank A. King

Feb. 20, 1934.　　　F. A. KING　　　1,947,853
MECHANICAL MOVEMENT
Filed April 5, 1932　　　3 Sheets-Sheet 2

Inventor
Frank A King

Feb. 20, 1934.  F. A. KING  1,947,853
MECHANICAL MOVEMENT
Filed April 5, 1932  3 Sheets-Sheet 3

Inventor
Frank A. King

Patented Feb. 20, 1934

1,947,853

UNITED STATES PATENT OFFICE 1,947,853

MECHANICAL MOVEMENT

Frank A. King, Englewood, Colo.

Application April 5, 1932. Serial No. 603,373

14 Claims. (Cl. 74—7)

My invention relates to mechanical movements, and particularly to means for adjusting a rotary element during its rotation. This application is a continuation, in part, of my application Serial No. 552,117, filed July 21, 1931.

An important object of the invention is to transmit at will independent movement to an element of a rotary body or assembly during rotation, by direct gear connection with an external source of power. Another object is to provide means to control the speed and direction or path of travel of said element.

A further object is to provide means to control movements of a reciprocating member on a rotary body, during rotation of the latter.

Another object is to provide means to control the movements of a rotatable member on a rotary body, during rotation of the latter.

A still further object is to provide positive means whereby the adjustable parts of the assembly comprising the invention will be positively held against accidental movement. Another object is to provide speed reduction means so that a relatively great amount of motion will be required to make a small adjustment of the element or member of the rotary assembly. The speed reduction means gives great accuracy and precision to the function of the present invention.

The primary object of this invention is to provide a manually controlled gear constantly in mesh with a planetary gear train provided with intermediate members in connection with an element which normally rotates as a unit with a rotating assembly; this affords accurate means of adjusting the element or member a predetermined amount with respect to the rotary assembly.

Another object lies in providing such a mechanism that is capable of producing unlimited simultaneous relative rotative movement between a rotating shaft and a coaxially free member mounted for rotation therewith.

The present invention contemplates improvements in the pinion carrier member or spider disclosed in my prior applications Serial No. 552,-117, filed July 21, 1931, and Serial No. 417,080, filed December 28, 1929, such improvements were also disclosed in my co-pending application Serial No. 579,410, filed December 7, 1931.

In the planetary bevel gear structure of the type employed by me, radial axial forces are generated due to angularity of the bevel gears tending to force the planetary bevel pinions radially outward, therefore it is an object of my invention to provide a floating spider or bevel pinion carrier adapted to surround and embrace the pinions in such manner as to allow the latter to automatically seek an orbit in which the tooth load and radial thrust load of the pinions are balanced against their respective bevel gears.

Still other objects reside in detail of construction and in novel combinations and arrangements of parts, which will appear in the course of the following description.

It is to be understood that while the drawings show and the following specifications describe several uses of the invention, I do not wish to be limited to such uses. The present invention resides primarily in the mechanism for producing a simultaneous relative rotative movement between a rotating shaft and a co-axially free member thereon.

In the drawings, like reference characters designate similar parts in the several views.

Figure 3:
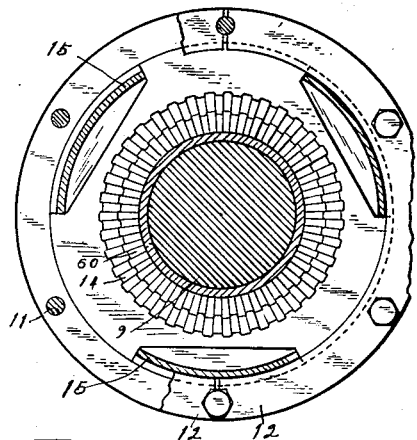
Fig. 3 is a sectional view taken on lines 3—3, of Fig. 1 showing the floating pinion carrier.

Referring more in detail to my invention, the reference numeral 8 designates a base or other relatively stationary supporting element upon which the mechanism is mounted. Shaft 9 is driven by an engine or other source of power not shown. A shoulder or base plate 10 is attached to the supporting element 8 by bolts 11 which secure an annular split retaining ring 12 (as shown in Fig. 3) to the plate 10.

The retaining ring 12 projects inwardly over the shoulder on plate 10 so as to form a recess 13 in which is loosely supported an annular ring bevel gear 14 and a sprocket wheel 15 which is provided with an inner flange 15a; a chain 16 cooperates with sprocket 15 and also with the sprocket 17, which may be turned by the hand wheel 18 or any other well known means.

Shaft 9 is provided with splines 19 and a threaded portion 20, over which is placed the usual retainer nut 21 and spacer ring 22. Abutting the spacer ring 22 is a bevel gear 23 provided with corresponding internal splines or keys as indicated by dotted lines 24, which engage the splines 19 of the shaft 9 whereby the gear is prevented from rotating on the shaft. Abutting the gear 23 is the usual tapered split thrust ring 25. A nut 26 secures the hub 27 to shaft 9 and the hub is forced to rotate with the shaft by means of internal splines within the hub which engage the splines on the shaft.

Interposed between the gear 23 and the shoulder portion 28 on the hub is loosely mounted a bevel gear 29 which carries an annular oil slinger or shield 29a which extends outwardly overlapping the inner surface of flange 15a. Gear 29 is a unitary gear and has a worm gear 30 integral therewith as will hereinafter be described.

The hub has formed integral therewith radial arms 31 which carry adjustable propeller blades, where root portions or shanks are shown at 32. Since the blade mountings are identical in construction, the description will proceed in the singular number. The arm 31 is provided on its radially inner end with buttress threads 33 and is provided at its outer end with reduced cylindrical spindle portions 34—34 which are adapted to enter bushings 35—35, the latter being pressed into the bore 32a of the blade shank 32. Numerals 36—36 designate the ball races of antifriction thrust bearing which is placed over the arm 31 and is secured thereto by nut 37 and grub screw 38.

The blade shank is secured to the arm 31 for angular adjustment by means of split clamping sleeve members 39 and 40, such as are disclosed in my application Serial No. 579,410, filed December 7, 1931.

Sleeve members 39 and 40 are secured to the bearings 36—36 and the blade shank 32, by bolts 41 or other suitable clamping means and are restrained against outward movement by an internal annular shoulder 42 which abuts against the antifriction bearing 36—36 located within the sleeve members. The blade shank 32 is restrained against outward movement with respect to the sleeve members 39 and 40 by the action of the flanges or grooves 43—43 which abut against corresponding flanges or grooves in the sleeve members 39 and 40.

Formed integral with the hub 27 is a bifurcated arm 44 bored to receive a spindle bolt 45 that is secured thereto by a nut 46. Rotatably mounted on the spindle bolt 45, is a worm gear 47 (best shown in Fig. 2) which meshes with a section of worm gear teeth 48 provided on the outside end of sleeve 39 near its inner end. The gear teeth 48 are of the same pitch diameter as those of gear 30, which is mounted for rotation on the shaft.

The worm gear 47 is of the generated type and is formed with a transverse spur gear cut 49 taken through the worm gear teeth thereof, thus forming a dual gear, the teeth of this gear are also in mesh with worm gear 30.

The plate 10 has formed integral therewith a bevel gear 50 of the same diameter and pitch as gear 23, which as stated, rotates with the shaft 9.

I preferably provide a floating pinion carrier or spider member 51, which is adapted to surround the bevel pinions. Formed radially and on the inner portion of member 51 are stub shafts 52 on these inwardly projecting shafts are loosely carried pairs of pinion gears 53 and 54, which serve to constitute a duplex planetary gear train.

A slight clearance is provided between the inner ends of shafts 52 and the spacer ring 22, or shaft 9, to allow for a limited floating movement thereof radially about the shaft. Thus the pinion carrier is adapted to automatically seek its one orbit in which the tooth load and radial thrust load of the various pinions are balanced against their respective bevel gears.

From the drawings it will be seen that variation of pressure on a pair of pinions will immediately be transmitted to and equalized by the pressure of the remaining pairs of pinions. Any unbalanced pressure on a pair of pinions due to wear or other cause, will result in transferring the pinion carrier to its normal path of travel, and it will therefore automatically seek an orbit in which the tooth load and radial thrust load of the various pinions are equally balanced against their respective bevel gears.

The novel structure of the pinion carrier described above dispenses with the need for a center bearing and affords the advantage of mounting the various pinions adjacent to the drive shaft thus reducing the diameter of the bevel gears, and the friction of the idly rotating parts to the minimum wherein a proportionately slight friction will be greatly overshadowed by the value of the function.

Pinion 53 meshes with gear 23, and the stationary gear 50 which is formed integral with plate 10, while pinion 54 meshes with gear 14, and gear 29, on the dual gear. The function of pinion 53 is to maintain pinion 54 in the desired position while making adjustments. When adjustments are not being made, pinion 53 rotates idly about the shafts 52 on the carrier and no reaction is caused thereby.

The operation of my invention is as follows: When gear 14 is held stationary it functions in the same manner as the stationary gear 50, when the shaft 9 is rotated the gear 23 which is attached to it rotates the gear 53 which travels along gear 50 and carries with it the rotating pinion carrier 51, and also the intermediate or idler gear 54. Gear 54 moves along gear 14 in the same manner as gear 53, with respect to gear 50, thus the gears 29 and 23 are unlocked with respect to each other and revolve at the same speed. If then gear 14 is rotated by manual manipulation or otherwise the gear 29 will rotate with respect to the shaft, one way or the other, and will rotate worm 30 which in turn will rotate the dual gear 47 and blade shank 32 through the action of gear teeth 48, on the sleeve 39. No lock is necessary to hold gear 14 and the dual gear 47 from rotating relative to their supports, when adjustments are not being made, since, due to the pitch of the worm dual gear 47, the section of teeth 48 are locked in the worm threads.

Figure 4:
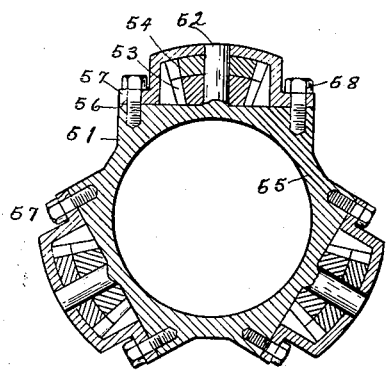
Fig. 4 is a sectional view of a modified form of pinion carrier.

Fig. 4 shows a modified form of pinion carrier which may be used as a semifloating pinion carrier by mounting the internal portion 55, of the carrier 51' on the shaft. The carrier may also be used as a full floating carrier by leaving a slight clearance between the drive shaft and the internal portion 55. The pinion carrier 51 has formed integral therewith a plurality of stub shafts 52 and is faced off at 56 to receive a cap 57. Pairs of pinion gears 53 and 54 are mounted on the stub shafts 52, and are secured thereto by caps 57 which abut the faced portion 56, and are secured thereto by screws or studs 58.

Figure 1:
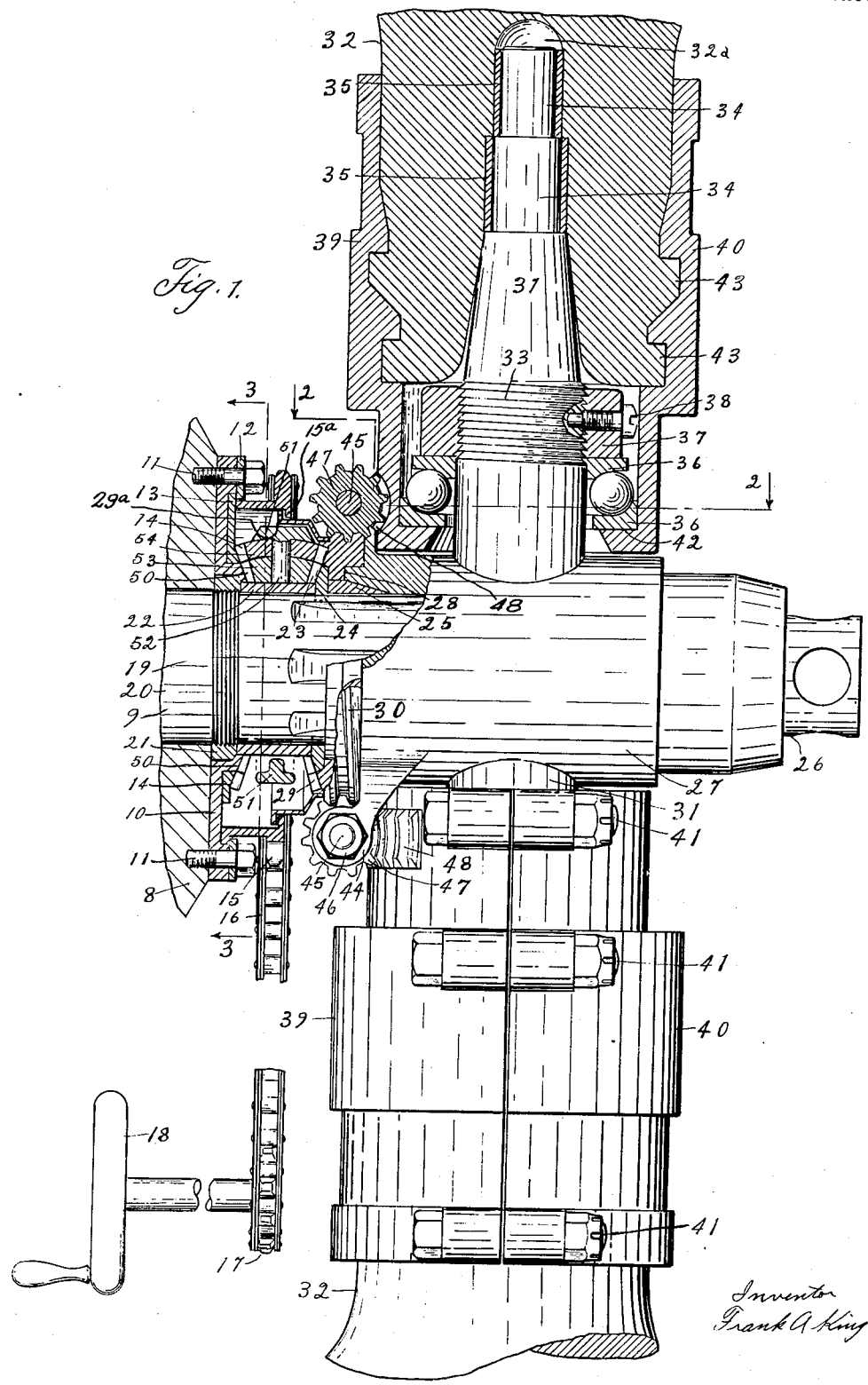
Fig. 1 is a partial longitudinal sectional view, portions being shown in elevation, this view shows the preferred embodiment of my invention as applied to an adjustable pitch propeller and a standard aeronautical engine.
Figure 2:
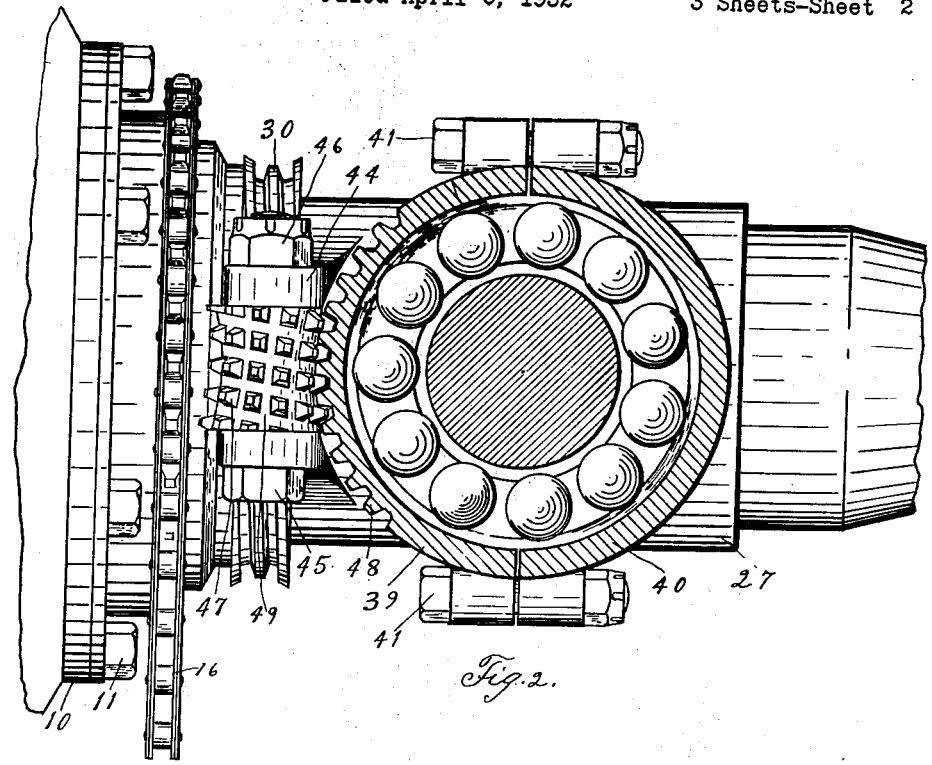
Fig. 2 is a cross sectional view taken on lines 2—2, of Fig. 1, and shows a portion of the controlling mechanism of the blades, the latter being held in position by split sleeve members partly shown in elevation.
Figure 5:
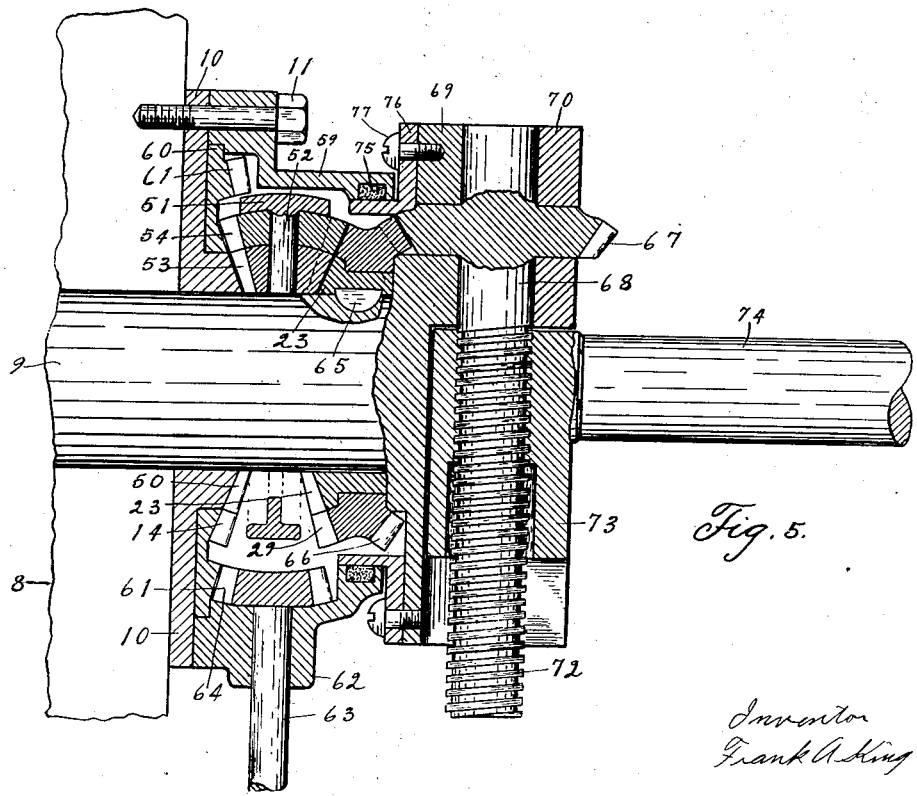
Fig. 5 is a longitudinal section through a modified form of the invention showing it applied to a boring bar or an adjustable crank pin.
Figure 6:
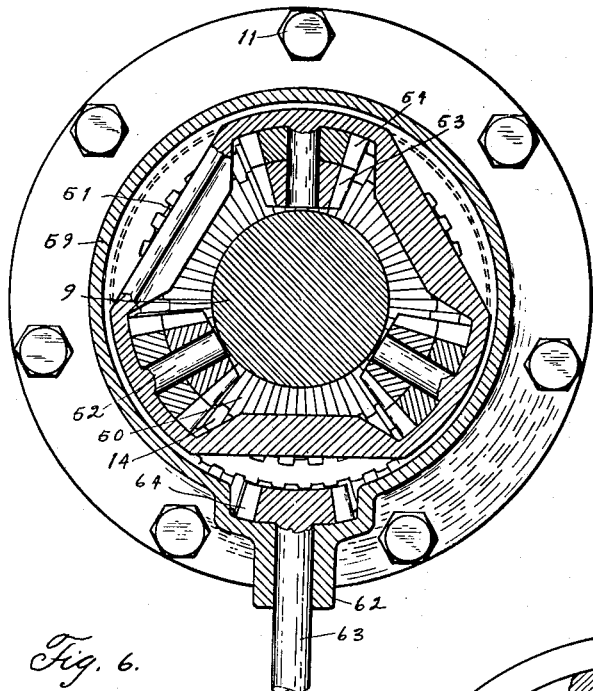
Fig. 6 is a sectional view taken on lines 6—6, Fig. 5.
Figure 7:
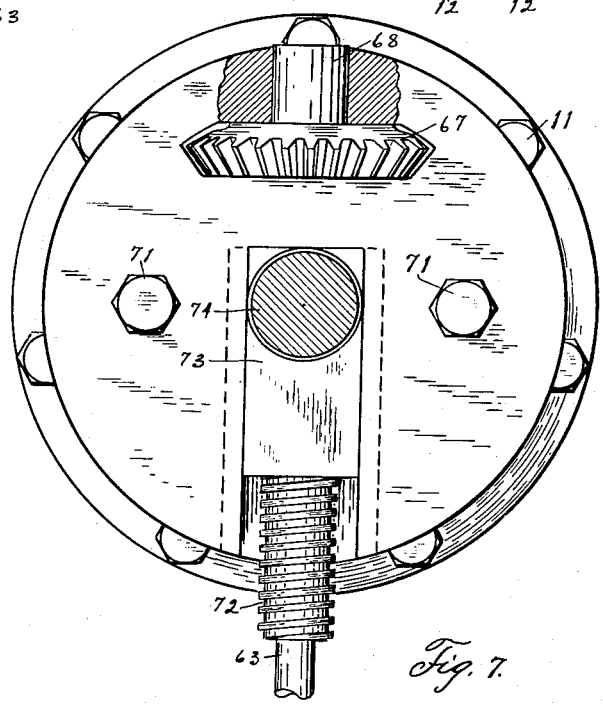
Fig. 7 is a sectional view taken on lines 7—7, Fig. 5.

In the modified form Figs. 5, 6 and 7, I have shown the same planetary gear mechanism as that disclosed in Figs. 1, 2 and 3, but applied to different uses as, for example, the rotary element to be adjusted, may be a boring bar or an adjustable crank pin. It is to be understood, however, that this mechanism will find many other uses.

With reference to Fig. 5, I have shown again the relatively stationary base or supporting element 8, upon which the mechanism is mounted. Shaft 9 is driven by power means (not shown). A shouldered base plate 10' and a flanged drum shaped housing 59 are secured to the base 8 by bolts 11. Formed on the inner portion of the housing 59 adjacent to the plate 10 is a shoulder 60 which rotatably supports a ring gear 14, integral therewith is another gear 61. Journaled in the boss portion 62 on the housing 59 is a shaft 63, integral therewith is a gear 64, which is in mesh with gear 61. The bevel gear 23 is keyed to the shaft 9 by key 65. The gear 29 has a bevel gear 66 integral therewith which meshes with a bevel gear 67 of the mechanism to be adjusted. The gear 67 is formed integral with a counter shaft 68, that is transverse to shaft 9.

A head 69 is formed on the end of shaft 9 and a complementary plate 70 is clamped thereto by bolts 71, to provide bearings for the counter shaft 68. The latter shaft has one end provided with adjusting threads 72 that carry a threaded sleeve 73, which in turn carries a mounting bar 74, for a boring bit, an adjustable crank pin or the like. Packing 75 is disposed between the housing 59 and an annular flanged member 76, which is secured to head 69 by screws 77.

In the operation of my invention, the shaft 9 is driven by a source of power (not shown). The driving gear 23 being keyed to the shaft rotates therewith. The function of the planetary gear 53 which meshes with driving gear 23 and the stationary gear 50, is to maintain the pinion carrier 51 in the desired position. As a result thereof, the pinion carrier rotates at half the speed of the driving gear 23 in the ratio shown in the drawings.

It is to be understood that changes may be made in the ratios shown without departing from the spirit and scope of the invention.

The pinion 54 rotates idly on the carrier between the bevel gears 14 and 29 until an adjustment is to be made. When an adjustment is to be made of a member on the element rotated by the shaft 9, the shaft 63 is rotated manually or otherwise. As stated this motion is transmitted through the train of gears as follows: Shaft 63, gear 64, bevel gear 61, pinion 54, unitary gears 29 and 66, and gear 67, the rotation of the latter causing the rotation of the adjusting screw 72. The screw 72 controls lateral movement of the bar 84 through the intermediary of sleeve 73.

No lock is necessary to hold the gear 14, or the screw 82 from rotation relative to their supports, when adjustments are not being made, since due to the pitch of the screw 72, reaction is eliminated.

It should be clearly understood that changes may be made in the construction, operation and arrangement of parts without departing from the spirit and scope of the invention, as outlined in the hereunto appended claims.

Having described my invention what is claimed as new is:

1. In mechanism of the class described, a turnable element, a movable member carried thereby, a drive shaft, said element being secured to said shaft, a relatively stationary gear, a revolvable gear, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, and means interposed between said movable member and the gear united with said free gear for operating the movable member from the free gear and for locking said movable member against retroactive movement.

2. In mechanism of the class described, a turnable element, a movable member carried thereby, a drive shaft, said element being secured to said shaft, a relatively stationary gear, a revolvable gear, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, and means interposed between said movable member and the gear united with said free gear for operating the movable member from the free gear and for locking said movable member against retroactive movement, said drive gear being positioned between the free gear and said relatively stationary gear.

3. In mechanism of the class described, a turnable element, a movable member carried thereby, a drive shaft, said element being secured to said shaft, a relatively stationary gear having substantially radial teeth, a revolvable gear of larger diameter than the stationary gear and having substantially radial teeth, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, and means interposed between said movable member and the gear united with said free gear for operating the movable member from the free gear and for locking said movable member against retroactive movement.

4. In mechanism of the class described, a turnable element, a movable member carried thereby, a drive shaft, said element being secured to said shaft, a relatively stationary gear, a revolvable gear, a drive gear secured to and movable with the shaft, a free gear having an auxiliary gear united therewith, all of said gears with the exception of the auxiliary gear being of the bevel type, a pinion carrier positioned between certain of said gears and provided with a plurality of radial shafts, inner and outer bevel pinions mounted on the radial shafts, the inner pinion being in mesh with the stationary gear and drive gear and actuated by the latter, the outer pinion being in mesh with said revolvable gear and the free gear and on being rotated by the revolvable gear functioning to adjust the free gear, and means interposed between said movable member and the auxiliary gear for operating the movable member from the free gear and for locking said movable member against retroactive movement.

5. In mechanism of the class described, a turnable element, a movable member carried thereby, a drive shaft, said element being secured to said shaft, a relatively stationary gear, a revolvable gear, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, means interposed between said movable member and the gear united with said free gear for operating the movable member from the free gear and for locking said movable member against retroactive movement, and means for controlling said revolvable gear.

6. In mechanism of the class described, a turnable element, a movable member carried thereby, a drive shaft, said element being secured to said shaft, a relatively stationary gear, a revolvable gear, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, means interposed between said movable member and the gear united with said free gear for operating the movable member from the free gear and for locking said movable member against retroactive movement, and manually controlled means secured to the revolvable gear for actuating the latter.

7. In mechanism of the class described, a turnable element, a movable member carried thereby, a drive shaft, said element being secured to said shaft, a relatively stationary gear, a revolvable gear, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, and means interposed between said movable member and the gear united with said free gear for operating the movable member from the free gear and for locking said movable member against retroactive movement, said planet gear carrier comprising a floating frame to which the radial shafts are secured.

8. In mechanism of the class described, a turnable element, a movable member carried thereby, a drive shaft, said element being secured to said shaft, a relatively stationary gear, a revolvable gear, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, means interposed between said movable member and the gear united with said free gear for operating the movable member from the free gear and for locking said movable member against retroactive movement, and an oil slinger positioned between the revolvable gear and the free gear.

9. In mechanism of the class described, a turnable element, a movable member carried thereby, a drive shaft, said element being secured to said shaft, a relatively stationary gear, a revolvable gear, a drive gear secured to and movable with the shaft, a free gear having a worm united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, and means including a worm gear meshing with the worm and interposed between the latter and said movable member for operating the movable member from the free gear and for locking said movable member against retroactive movement.

10. In mechanism of the class described, a turnable element, a movable member carried thereby, a drive shaft, said element being secured to said shaft, a relatively stationary gear, a revolvable gear, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, and means interposed between said movable member and the gear united with said free gear for operating the movable member from the free gear and for locking said movable member against retroactive movement, said planet gear carrier being of the floating type and adapted to seek its own orbit and solely supported by said radial shafts.

11. In mechanism of the class described, a turnable element, a movable member carried thereby, a drive shaft, said element being secured to said shaft, a relatively stationary gear, a revolvable gear, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, and means interposed between said movable member and the gear united with said free gear for operating the movable member from the free gear and for locking said movable member against retroactive movement, said inner gear being adapted to individually drive the planet gear carrier at a constant speed ratio equal to half that of the drive shaft when adjustments of the free gear are being made.

12. In mechanism of the class described, a turnable element, a movable member carried thereby, a drive shaft, said element being secured to said shaft, a relatively stationary gear, a revolvable gear, a drive gear secured to and movable with the shaft, a free gear having a gear united therewith, a planet gear carrier positioned between certain of said gears and provided with a plurality of radial shafts, inner and outer gears mounted on the radial shafts, the inner gear being in mesh with the stationary gear and drive gear and actuated by the latter, the outer gear being in mesh with said revolvable gear and the free gear and on being rotated by the revolvable gear functioning to adjust the free gear, means interposed between said movable member and the gear united with said free gear for operating the movable member from the free gear and for locking said movable member against retroactive movement, said revolvable gear being provided with an inwardly extending flange, and an oil shield mounted on the free gear and having an outwardly extending flange overlapping the flange of the revolvable gear and positioned inwardly of the last mentioned flange.

13. In mechanism of the class described, a turnable element, a movable member carried thereby, a drive shaft, said element being secured to said shaft, a relatively stationary gear, a revolvable gear, a drive gear secured to and movable with the shaft, a free gear having an auxiliary toothed portion, a floating gear element including a first gear and a second gear, said second gear engaging said revolvable gear and said free gear and on being rotated by the revolvable gear functioning to adjust the free gear, said first gear being in mesh with the stationary gear and drive gear and actuated by the latter, and means interposed between said movable member and the auxiliary toothed portion of the free gear for operating the movable member from the free gear and for locking said movable member against retroactive movement.

14. In mechanism of the class described, a turnable element, a movable member carried thereby, a drive shaft, said element being secured to said shaft, a relatively stationary gear, a revolvable gear, a drive gear secured to and movable with the shaft, a free gear having an auxiliary toothed portion, a floating gear element including a first gear and a second gear, said second gear engaging said revolvable gear and said free gear and on being rotated by the revolvable gear functioning to adjust the free gear, said first gear being in mesh with the stationary gear and drive gear and actuated by the latter, and means including an intermediate member interposed between said movable member and the auxiliary toothed portion of the free gear for operating the movable member from the free gear and for locking said movable member against retroactive movement.

FRANK A. KING.